No. 727,448. PATENTED MAY 5, 1903.
F. RIFFLE.
NUT LOCK.
APPLICATION FILED MAR. 2, 1903.
NO MODEL. 2 SHEETS—SHEET 1.
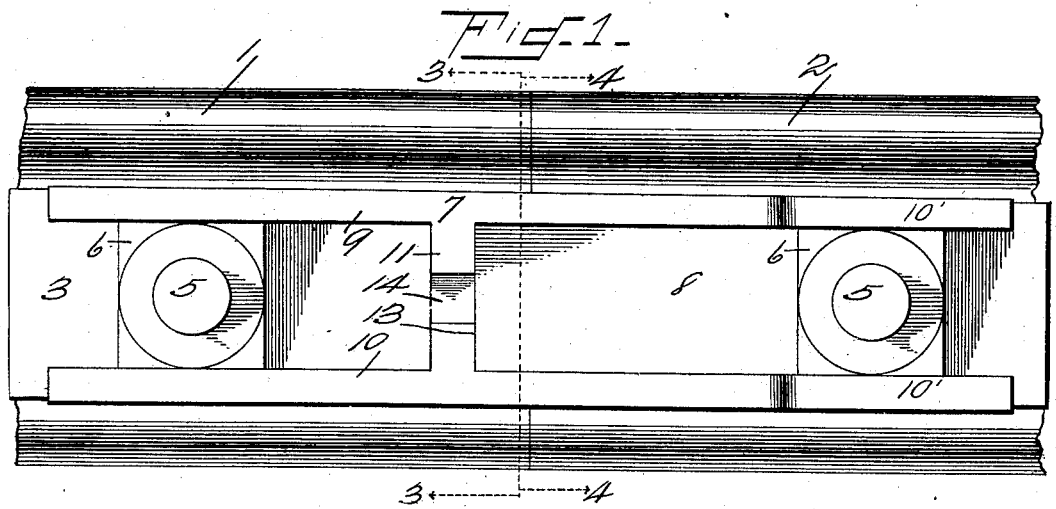
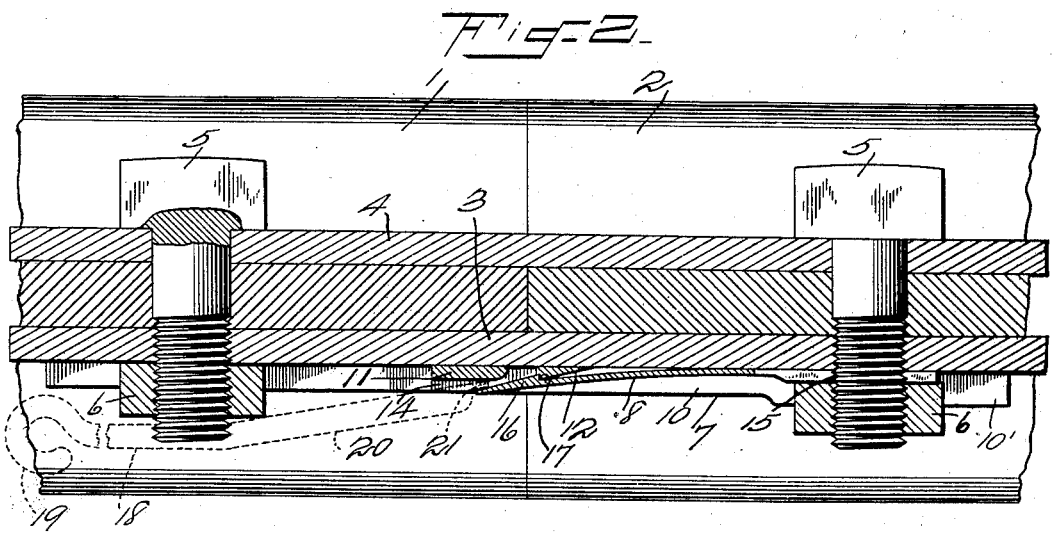
Witnesses
George Hilton
A. B. Wilson
Inventor
Frederick Riffle,
By A. B. Wilson
Attorney No. 727,448. PATENTED MAY 5, 1903.
F. RIFFLE.
NUT LOCK.
APPLICATION FILED MAR. 2, 1903.
NO MODEL. 2 SHEETS—SHEET 2.
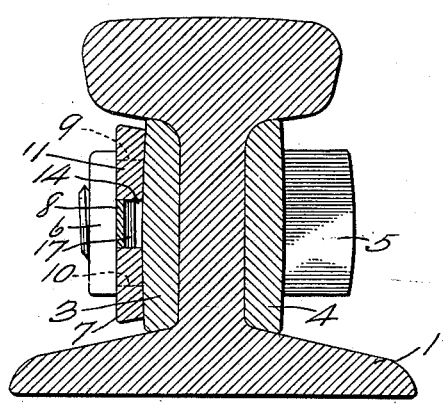
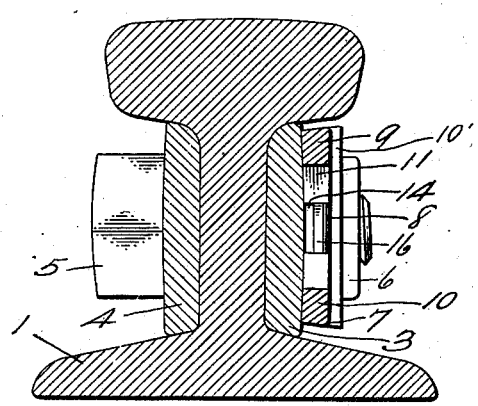
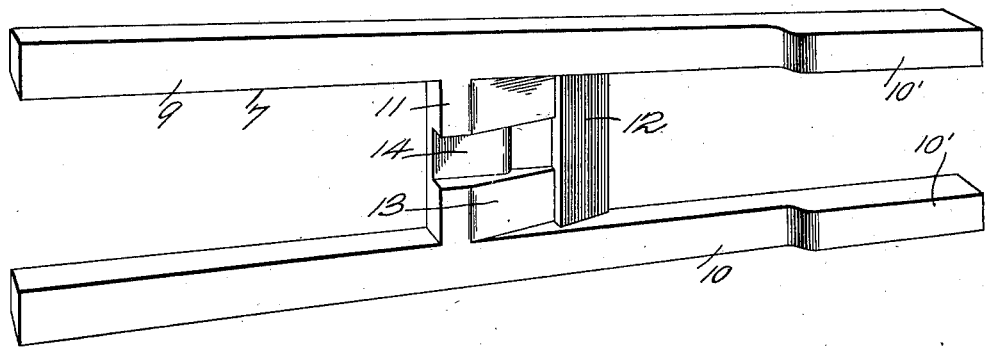
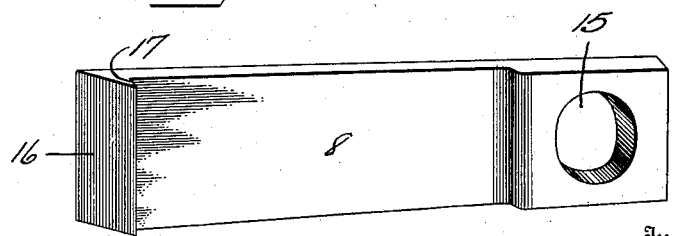
Witnesses
George Hilton
Inventor
Frederick Riffle,
By H. R. Wilson
Attorney No. 727,448. Patented May 5, 1903.

UNITED STATES PATENT OFFICE.

FREDERICK RIFFLE, OF HULL, ILLINOIS, ASSIGNOR OF ONE-HALF TO LEO F. WATERS, OF HULL, ILLINOIS.

NUT-LOCK.

SPECIFICATION forming part of Letters Patent No. 727,448, dated May 5, 1903.

Application filed March 2, 1903. Serial No. 146,766. (No model.)

*To all whom it may concern:*

Be it known that I, FREDERICK RIFFLE, a citizen of the United States, residing at Hull, in the county of Pike and State of Illinois, have invented certain new and useful Improvements in Nut-Locks; and I do declare the following to be a full, clear, and exact description of the invention, such as will enable others skilled in the art to which it appertains to make and use the same.

This invention relates to nut-locks; and its object is to provide simple and efficient means for securing the nuts or bolts against retrograde rotation, such means being applicable without changing the construction of the bolts or nuts in any way.

With these and other objects in view the invention consists in certain novel features of construction, combination, and arrangement of parts, which will be hereinafter more fully described, and particularly defined in the appended claims.

In the accompanying drawings, Figure 1 is an outer side view of the coupled ends of two railway-rails, showing the application of the invention to the nuts of the coupling-bolts. Fig. 2 is a horizontal section of the same, showing in broken lines the mode of retracting the spring to release the nut-holder. Figs. 3 and 4 are cross-sections on line 3 3 and line 4 4 of Fig. 1. Figs. 5 and 6 are detail perspective views of the nut-holder and locking-spring, and Fig. 7 is a detail view of the tool used to retract the spring.

Referring now more particularly to the drawings, the numerals 1 and 2 represent the meeting ends of adjoining railway-rails, to which the invention is shown in the present instance applied, the said rails being connected by the inner and outer fish-plates 3 and 4 and the bolts 5, provided with the usual holding-nuts 6.

In carrying my invention into practice I provide a nut-lock consisting, essentially, of two parts—to wit, a nut-holder 7, which engages a nut and prevents retrograde rotation of the same, and a locking-spring 8, which fastens the said holder in position against casual disengagement or withdrawal. The holder 7 comprises a pair of parallel arms 9 and 10, connected at a point preferably intermediate of their length by a cross-piece or plate 11. This cross-piece or plate 11 has a beveled face 12 and a bevel-walled recess 13, which latter is intersected by a notch or recess 14. The spring 8 is provided at one end with an opening 15, by which it is adapted to be fitted upon one of the bolts 5 and to be clamped against the fish-plate by the coacting nut 6, and it is formed at its free end with a beveled face 16, terminating in a locking-shoulder 17.

In the application of the invention the spring-plate is mounted upon one of the bolts in the manner shown, and if two nuts are to be connected and held locked is extended so that its free end will lie between the two bolts. The nut-holder is then placed in position, with the recessed and beveled side of its cross-piece facing outwardly and its arms 9 and 10 embracing the nuts, so as to bear against the upper and lower sides of the nut, and then said holder is slid toward the spring 8 and the beveled face 12 thereof comes into contact with the beveled face 16 of the spring and forces the free end of the spring outwardly, the said free end of the spring riding up on the beveled face 12 until the locking-shoulder 17 of the spring comes into line with and snaps into the locking-recess 13, when the holder will be secured firmly by the spring in position against withdrawal, thus preventing the nuts from turning on the bolts 5. It will of course be understood that the holder may be employed for locking a single nut or two adjacent nuts, as represented in the present illustration.

In order to compensate for the thickness of the spring-plate, the arms 10 of the nut-holder are formed with offsets or thickened portions 10' at their free ends, so that said arms 10, which engage the nut confining the spring-plate in place, will project as far over upon the said nut as the arms 9 extend over the other nut, and thus obviate all liability of the first-named nut casually turning after the parts have become loosened from wear.

In order to enable the holder to be released when desired, I provide the form of implement shown in Fig. 7, consisting of a rod or bar 18, shaped at one end to form a suitable handle 19 and provided with an opposite obliquely-extending end 20, terminating in a lip 21. When it is desired to release the holder, this lip is inserted in the notch or recess 14 until it comes beneath the beveled surface of the locking-spring, and then the tool is rested against the adjacent nut 6 and turned thereon as a fulcrum to force the free end of the spring outwardly, thus withdrawing the locking-shoulder 17 out of engagement with the recess 13 and permitting of the withdrawal and disconnection of the holder by a sliding movement away from the spring and an outward movement away from the rails, as will be readily understood.

It will be apparent that the spring-plate may be applied to either bolt and the parts locked as well in either arrangement by the simple reversal of the nut-holder.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of the invention.

Having thus described my invention, what I claim as new, and desire to protect by Letters Patent, is—

1. In a nut-lock, the combination with a bolt and its nut, of a locking-spring secured by the bolt and having a beveled face terminating in a locking projection, and a nut-holder having a beveled face terminating in a locking-recess, said holder and spring adapted to be interlocked by a sliding movement, whereby the beveled faces ride upon one another and the locking projection of the spring snaps into said recess, substantially as described.

2. In a nut-lock, the combination with a bolt and its nut, of a nut-holder having parallel arms to engage sides of the nut and hold the same against retrograde rotation and provided with a cross-piece connecting said arms, said cross-piece being formed with a beveled edge terminating in a recess, and a locking-spring mounted at one end upon the bolt and held thereon by the nut and provided at its free end with a beveled face terminating in a locking projection, substantially as described.

In testimony whereof I have hereunto set my hand in presence of two subscribing witnesses.

FREDERICK RIFFLE.

Witnesses:
LEO. F. WATERS,
AUGUST DELABAR.